US009277257B1

(12) United States Patent
Nijim et al.

(10) Patent No.: US 9,277,257 B1
(45) Date of Patent: Mar. 1, 2016

(54) AUTOMATIC VIDEO SERVICE ACTIONS BASED ON SOCIAL NETWORKING AFFINITY RELATIONSHIPS

(71) Applicant: Cox Communications, Inc., Atlanta, GA (US)

(72) Inventors: Yousef Wasef Nijim, Roswell, GA (US); James Alan Strothmann, Johns Creek, GA (US); Jay Paul Langa, Cumming, GA (US); Eric S. Roberts, Johns Creek, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 14/531,660

(22) Filed: Nov. 3, 2014

(51) Int. Cl.
| | |
|---|---|
| *H04H 60/32* | (2008.01) |
| *H04N 7/173* | (2011.01) |
| *H04N 21/25* | (2011.01) |
| *H04N 21/24* | (2011.01) |
| *H04N 21/258* | (2011.01) |
| *H04N 21/2668* | (2011.01) |
| *H04N 21/478* | (2011.01) |

(52) U.S. Cl.
CPC ......... *H04N 21/251* (2013.01); *H04N 21/2407* (2013.01); *H04N 21/2408* (2013.01); *H04N 21/25841* (2013.01); *H04N 21/25891* (2013.01); *H04N 21/2668* (2013.01); *H04N 21/478* (2013.01)

(58) Field of Classification Search
None
See application file for complete search history.

(56) References Cited

U.S. PATENT DOCUMENTS

| 6,637,029 | B1* | 10/2003 | Maissel ............. H04N 5/44543 348/E5.105 |
| 6,757,691 | B1* | 6/2004 | Welsh .................... G06Q 30/02 |
| 2009/0271820 | A1* | 10/2009 | Choi .................. H04N 7/17309 725/37 |
| 2011/0184899 | A1* | 7/2011 | Gadanho ............... G06Q 30/02 706/46 |
| 2011/0289139 | A1* | 11/2011 | McIntosh et al. ............ 709/203 |
| 2012/0047529 | A1* | 2/2012 | Schultz et al. .................. 725/34 |
| 2012/0173625 | A1* | 7/2012 | Berger .......................... 709/204 |
| 2013/0238588 | A1* | 9/2013 | Annau .............. G06F 17/30663 707/708 |
| 2013/0263185 | A1* | 10/2013 | Wood et al. ..................... 725/56 |
| 2013/0305280 | A1* | 11/2013 | Fleischman .................... 725/34 |
| 2014/0033075 | A1* | 1/2014 | Lansford et al. ............. 715/753 |
| 2014/0067828 | A1* | 3/2014 | Archibong et al. .......... 707/748 |
| 2014/0067998 | A1* | 3/2014 | Garcia et al. ................. 709/217 |
| 2014/0359647 | A1* | 12/2014 | Shoemake ......... H04N 5/23206 725/10 |

* cited by examiner

*Primary Examiner* — Nathan Flynn
*Assistant Examiner* — William J Kim
(74) *Attorney, Agent, or Firm* — Merchant & Gould (57) ABSTRACT

An affinity mapping service system allowing a video service provider to perform one or more automatic actions related to a video content item (e.g., automatically recording the video content item, recommending similar video content, automatically tuning to a channel airing the video content item, providing a notification when the video content item is airing, etc.) based on an affinity selection made by a user for a content object related to the video content item is provided. The user is enabled to selectively pair a social networking service identifier (e.g., username, handle, etc.) with a video service account. An affinity selection made by the user via a social networking service in association with a video content item is communicated to the video service provider and mapped to an automatic action for the video service provider to take based on action preferences selected by the user.

19 Claims, 7 Drawing Sheets

AUTOMATIC VIDEO SERVICE ACTIONS BASED ON SOCIAL NETWORKING AFFINITY RELATIONSHIPS

BACKGROUND

Video content providers, television networks, and the like are using social media technologies to help improve and promote their content. For example, many shows, programs, and movies are represented in webpages and/or in various social networking services via blogs, microblogs, pages, and the like via which users can read up on certain episodes, learn more about the actors, find out interesting facts about the show, program, or movie, etc. Additionally, functionalities are typically provided for enabling users to communicate or share what they like, enjoy, and/or to support certain content. For example, webpages and social networking services oftentimes display a selectable feature with content, which when selected, conveys a user's affinity for the content with which the feature is displayed. Selection of an affinity option by a user may encourage other people to view the content on the webpage, blog, microblog, or social networking system page, and may also provide feedback to the video content provider, television network, etc., of users' interest in the content.

It is with respect to these and other considerations that aspects of the present disclosure have been made.

SUMMARY

Aspects of the present disclosure provide for automatically performing an action within a video service based on an identified social networking affinity relationship between a video service subscriber and a content object related to a video content item. Aspects of an affinity mapping service system allow a video service provider to perform one or more automatic actions related to a video content item (e.g., automatically recording the video content item, recommending similar video content, automatically tuning to a channel airing the video content item, providing a notification when the video content item is airing, etc.) based on an affinity selection made by a user for a content object related to the video content item. The user is enabled to selectively pair a social networking service identifier (e.g., username, handle, etc.) with a video service account. An affinity selection made by the user via a social networking service in association with a video content item is communicated to the video service provider and mapped to an automatic action for the video service provider to take based on action preferences selected by the user.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

An affinity mapping service system and accompanying method are described herein and are illustrated in the accompanying figures. The system allows a video service subscriber/user (herein referred to as a user) to associate a social networking service identifier (e.g., social networking username or handle) with a video service provider account and select preferences regarding automatic actions that the user would like for the video service provider to take based on an affinity relationship between the user and a social networking service content object related to a video content item.

An affinity relationship is created between the user and a social networking content object (e.g., service blog, microblog, page, video clip, photo, advertisement, etc.) related to a video service provider-supported video content item (herein referred to as a social video content item) when the user selects an affinity user interface (UI) component associated with the social networking content object. For example, the user may click on an affinity UI component (e.g., a "like" button) on a social networking service page for a particular television show, and an edge relationship is created between the user and the social networking service page for the particular television show in a social networking service social graph.

The video service provider can request information from the social networking service, for example, via a call to a social networking service graph application programming interface (API). According to an aspect, the video service provider may query the graph for content objects related to video content items for which a specific video service user has selected an affinity UI component, or the video service provider may query the graph for video service users who have selected an affinity UI component for a specific content object related to a video content item.

The requested information is communicated to the video service provider, where it can be parsed for relevant affinity relationships, for example, relationships between a specific video service user and one or more video content items or between a specific video content item and one or more video service users. Affinity relationships are indexed in the video service provider system, and an association is made between the each user's social networking service identifier and his/her video service provider account. The video service provider's video content programming lineup for each user is queried, and an action within the video service is performed for each available video content item with which a user has an affinity relationship. Examples of actions performed within the video service for a video content item with which a user has an affinity relationship include, but are not limited to, automatically scheduling a recording of the video content item to the user's digital video recorder (DVR), providing recommendations of similar video content items, automatically tuning to a channel airing the video content item, notifying the user when the specific social video content item is airing, etc.). The action is based on preferences made by the user for automatic actions for the video service provider to perform upon receiving an indication of an affinity relationship between the user and a video content item.

Figure 1:
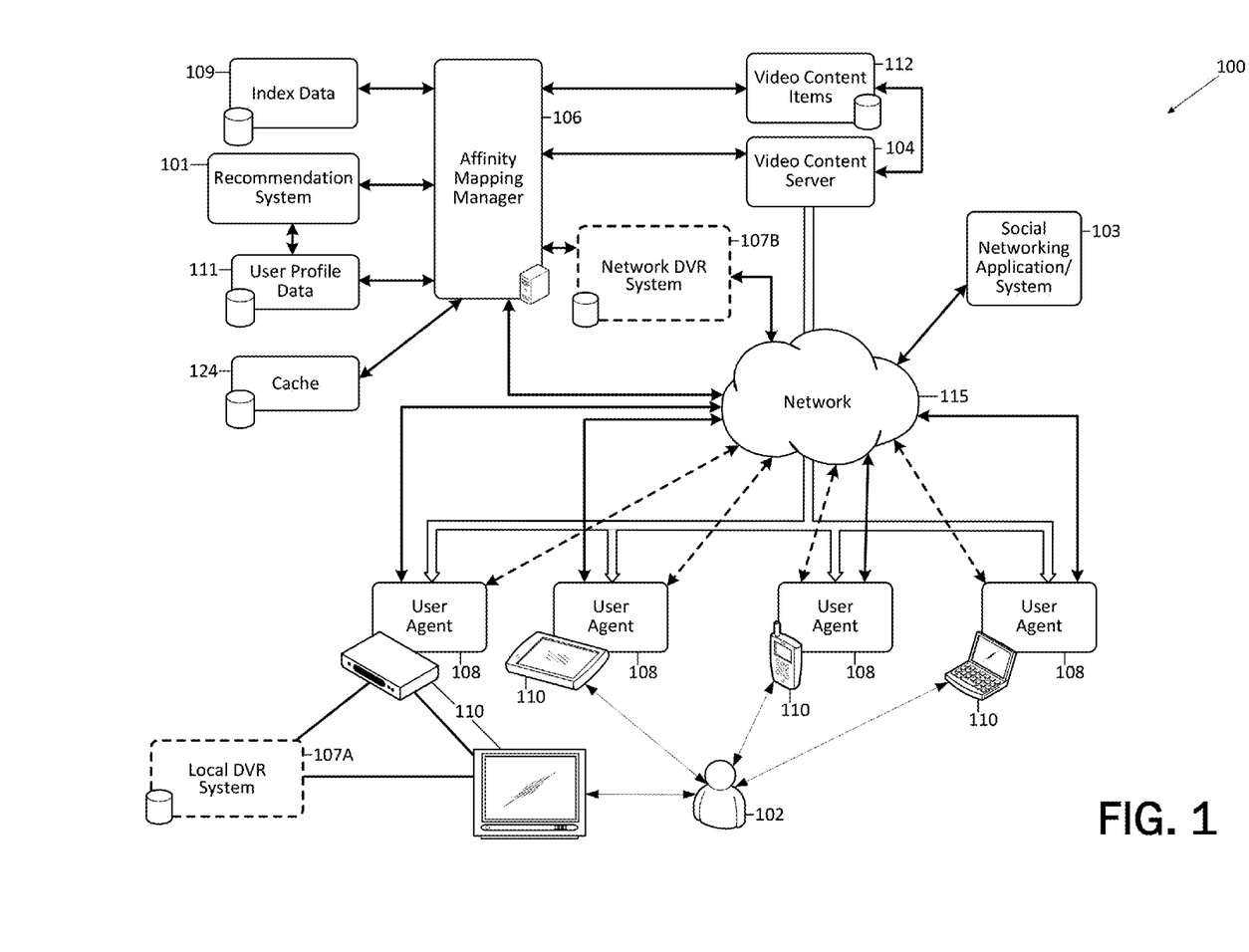
FIG. 1 is a simplified block diagram illustrating one example of an affinity mapping service system.

FIG. 1 is a simplified block diagram of one example of an affinity mapping service system 100. The affinity mapping service system 100 allows a video service provider to automatically perform one or more actions (e.g., automatic recording of video content, recommendations, automatic tuning, notifications, etc.) based on an identified affinity relationship between a user and a video content item. Examples of video service providers include providers of video programming, such as, but not limited to, multiple system operators, cable television (CATV) services system operators, direct-to-home (DTH) or direct broadcast satellite (DBS) operators (i.e., satellite system operators), terrestrial (i.e., over-the-air) broadcast system operators (e.g., networks and stations), Internet protocol television (IPTV) system operators, Internet television system operators, and Internet service providers.

Components of the affinity mapping service system 100 may operate as a distributed system where each component is accessed via a suitable network, or various components of the system may operate together as an integrated system. As illustrated, the affinity mapping service system 100 includes an affinity mapping manager 106 in communication with a video content server 104. The video content server 104 streams video content items to customer endpoint devices 110 over a network 115. Networks suitable for use with the affinity mapping service system 100 may include, but are not limited to, one or more of a television service provider content delivery network, the Internet, a wide area network, and a local area network. Examples of suitable endpoint devices 110 include, but are not limited to, digital set-top boxes (STBs), personal computers, tablet computing devices, smart phones, smart televisions, digital media players, and game consoles. A user agent 108 running on the endpoint device 110 receives the content stream and renders the video content item on a display associated with the endpoint device 110.

Video content items may be live or pre-recorded programs streamed as linear programming (e.g., the program lineup on a particular channel). Video content items also encompass non-linear programming from a video on-demand system. The affinity mapping manager 106 may be in communication with one or more data systems, such as, but not limited to, a video content item data system 112, a user profile data system 111, an index data system 109, a recommendation system 101, and a DVR system 107. Programming lineups and a listing of available video on-demand content items stored in a video content item system 112 may be communicated with the video content server 104 and the affinity mapping manager 106.

The affinity mapping service system 100 includes one or more social networking services 103 with which the affinity mapping manager 106 is in communication. Video content items that are available on the video service provider network may be represented in a social networking service 103 by a content object such as a social networking service page, blog, microblog, a video clip, a photo, an advertisement, etc. A selectable affinity UI component is linked to and displayed with the content object. When a user selects an affinity UI component displayed with the content object, a record of the interaction may be stored by the social networking service, for example, an affinity relationship edge is created between the user and the content object and stored in a social graph. According to an aspect, the selectable affinity UI component is a video service provider-provided UI component that is integrated and displayed with the content object. According to another aspect, the selectable affinity UI component is an existing social networking service UI component, for example, a "like" button, displayed with the content object. Selection of the UI component by a user 102 will herein be referred to as an affinity selection.

A user agent 108 (e.g., a television service provider guide or viewer application) running on the endpoint device 110 or on the network 115 may provide a user interface for receiving user input including a social networking service identifier (e.g., a username or handle) and user preferences regarding automatic actions that a user 102 would like for the video service provider to take upon receiving an indication of a user affinity selection via a social networking service 103. For example, the user 102 can specify for one or more of the following actions to be performed when a selection of the affinity UI component displayed with a content object related to a video content item on a webpage or in a social networking service blog, microblog, or page is made by the user: automatically scheduling a recording of the specific social video content item to the user's DVR 107A,B, providing recommendations of similar video content items, automatically tuning to the specific social video content item when it is airing, and/or notifying the user when the specific social video content item is airing. Additional information may be provided by the user 102, for example, permission for the video service provider to access the user's affinity selection information from the social networking service 103, a mobile phone number or email address for receiving a notification when the specific social video content item is airing, etc.

Social networking service identifiers, action preferences selected by the user (or default actions if the user 102 has not specified his/her preferences), and additional user input (e.g., permissions, mobile phone numbers, e-mail addresses, etc.) are communicated to the affinity mapping manager 106, and stored in the user profile data system 111. Additional video service account information for the user 102 may be stored in the user profile data system 111 such as endpoint device identifiers (e.g., user's STB media access control (MAC) address, user's DVR MAC address, etc.), the video content lineup available to the user (e.g., based on region, subscription, etc.), user entitlements, and user restrictions (e.g., parental controls). According to an aspect, the user profile data system 111 may also store information associated with the user's viewing history, demographic information, and video content preferences.

The index data system 109 stores a listing of the video service provider's social networking system promoted shows (i.e., social video content items). In other words, video content items represented by a content object in a webpage or a social networking service (e.g., blog, microblog, page, video clip, photo, advertisement, etc.) and which have an affinity UI component displayed for communicating user affinity selections to the affinity mapping manager 106 are indexed in the index data system 109. According to an aspect, the listing of social video content items may be indexed in a table. According to another aspect, a listing of users' social networking service identifiers and the users' associated video service account identifiers may be indexed in the index data system 109.

An indication of an affinity selection for a content object related to a social video content item made by a user 102 via a social networking service 103 is communicated to the affinity mapping manager 106 and stored in the index data system 109.

According to an aspect, the affinity mapping manager 106 makes a request for content objects for which a specific video service user 102 has selected an affinity UI component. For example, the affinity mapping manager 106 can make a request for the user's affinity selections. A request may be an active request (e.g., a pull), or the affinity mapping manager 106 can request to receive updates when a change in data related to the user's affinity selections occurs (e.g., a push).

The user's affinity selections returned to the affinity mapping manager 106 may include content objects that are of interest to the video service provider and content objects that are not of interest to the video service provider, or may only include content objects that are of interest to the video service provider. For example, if the user 102 selects an affinity UI component that is provided by the video service provider (i.e., a dedicated affinity UI component—not a general affinity UI component, such as a "like" or "share" button) for a content object related to a social video content item, the affinity selection can be categorized as a social video content affinity. Accordingly, when the affinity mapping manager 106 makes a request for a user's affinity selections, the affinity mapping manager 106 can request for only the user's social video content affinity selections. The information returned to the affinity mapping manager 106 may include an identifier of the social video content item represented by the content object for which the user 102 made an affinity selection.

However, if the user 102 selects a general affinity UI component provided by the social networking service 103, such as a "like" or "share" button, the request for a user's affinity selections may return the user's content object affinity selections that are relevant to the video service provider as well as the user's content object affinity selections that are not relevant to the video service provider. Accordingly, the information returned to the affinity mapping manager 106 may need to be parsed for affinity relationships between the user 102 and content objects related to social video content items.

According to another aspect, the affinity mapping manager 106 makes a request for users who have made an affinity selection for a specific content object related to a video content item. For example, the affinity mapping manager 106 can make a request on behalf of a specific content object, such as a social networking service page promoting a television program, for a listing of users who have affinitively selected the specific content object. A request may be an active request (e.g., a pull), or the affinity mapping manager 106 can request to receive updates when a change in data related to affinity selections of the content object occurs (e.g., a push). The information returned to the affinity mapping manager 106 may include social networking service identifiers (e.g., usernames or handles) of the users who have made an affinity selection for the content object.

The information returned to the affinity mapping manager 106 may include users who are of interest to the video service provider and users who are not of interest to the video service provider, or may only include users who are of interest to the video service provider. For example, users who are not subscribers to the video service provider may make an affinity selection for a content object related to a social video content item via a general affinity UI component provided by the social networking service 103, such as a "like" or "share" button. Accordingly, when the affinity mapping manager 106 makes a request for users who have affinitively selected the content object, the reply may include both video service provider subscribers and users who are not subscribers to the video service provider. Thus, the information returned to the affinity mapping manager 106 may need to be parsed for social networking service identifiers of the video service provider's subscribers.

The affinity mapping manager 106 parses the information received from the social networking service 103 if necessary, and passes users' social networking identifiers and the identifiers of the social video content item for which the users have made an affinity selection to the index data system 109 for indexing. Affinity relationships between users and social video content items may be indexed in a table. For example, a user's social networking service identifier is added to the table as a registered fan of the social video content item.

The affinity mapping manager 106 is operable to associate the user's social networking service identifier with the user's video service provider account, retrieve the video service provider's video content programming lineup for the user (stored in the video content item data system 112), and compare the programming lineup with the table of social video content items (stored in the index data system 109). When a match is found between the video service provider's video content programming lineup available to the user 102 and the social video content items for which the user is a registered fan (i.e., the social video content items with which the user has an affinity relationship), the affinity mapping manager 106 looks up the user's video service provider account user profile information (e.g., action preferences selected by the user (or default actions if the user 102 has not specified his/her preferences), endpoint device identifiers (e.g., user's STB MAC address, user's DVR MAC address, etc.), user entitlement and restrictions, and additional user information needed to perform the actions selected by the user 102).

The affinity mapping manager 106 is further operable to send requests associated with the user-selected actions to the appropriate systems. For example, if the user 102 selects automatic tuning to video content items with which the user has an affinity relationship, the affinity mapping manager 106 is operable to send a request to the user's STB (according to the endpoint device identifier (e.g., STB MAC address)) to automatically tune the STB at the appropriate time (according to the programming lineup) to the channel airing the social video content item.

As another example, if the user 102 selects automatic recording of video content items with which the user has an affinity relationship, the affinity mapping manager 106 is operable to send a request to the user's DVR system 107A,B (according to the endpoint device identifier (e.g., DVR MAC address)) to record the video content item when the video content item airs. The DVR system 107 may be a network DVR system 107B where recorded content is stored in a network-based data store and accessible via various endpoint devices 110, a local DVR system 107A where recorded content is stored in a locally-based data store and accessible to a local endpoint device 110, or a combination of a network and local DVR system (e.g., a network-based scheduling system for a locally-based DVR system). According to an aspect, a local DVR system 107A is connected to or integrated with a set-top box (STB) 718 in communication with a television set.

As another example, if the user 102 selects to be notified when a video content item with which the user has an affinity relationship is airing, the affinity mapping manager 106 is operable to send a notification to the user 102 via the network 115, for example, a short message service (SMS) text to the user's mobile phone (according to the user's profile data), an email message to the user's email mailbox (according to the user's profile data), or a message, such as a pop-up message, to the user agent 108 (e.g., a television service provider guide or viewer application) running on an endpoint device 110.

As another example, if a user 102 selects to receive recommendations similar to video content items with which the user has an affinity relationship, the affinity mapping manager 106 may communicate the video content item associated with the user's social networking system affinity selection to the recommendation system 101. According to an aspect, the recommendation system 101 is operable to compare metadata on the video content item associated with the user's social networking system affinity selection with metadata on other available video content items and recommend one or more video content items to the user according to a similarity (e.g., topic, actors, producer, genre, etc.) to the video content item with which the user has an affinity relationship. In various aspects, the recommendation system 101 is in communication with the user profile data system 111, and is operable to select recommended video content items based on information known about the user 102, such as the user's viewing history, demographic information about the user, the user's video content preferences, and the user's entitlements and restrictions. The affinity mapping manager 106 receives the recommendations determined by the recommendation system 101, and provides the recommendations to the user 102 via the user agent 108.

The social video service 100 may include a cache 124 operable to store various types of information. For example, for a given session, data relating to a user's preferences, affinity selections, or consumption patterns may be temporarily stored in the cache 124 for use by the affinity mapping manager 106 before the data is stored in the user preference data system 111, index data system 109, or recommendation system 101. The cache 124 is illustrated in FIG. 1 as a remote element, but may be integrated with the affinity mapping manager 106.

According to aspects, the affinity mapping manager 106 may be a software application having sufficient computer executable instructions for performing the functions described herein. The affinity mapping manager 106 may operate as part of a video content service provider system or as a standalone application or service that may be called on by a social networking service 103 or a video content service provider system for providing the functionality described herein.

Figure 2:
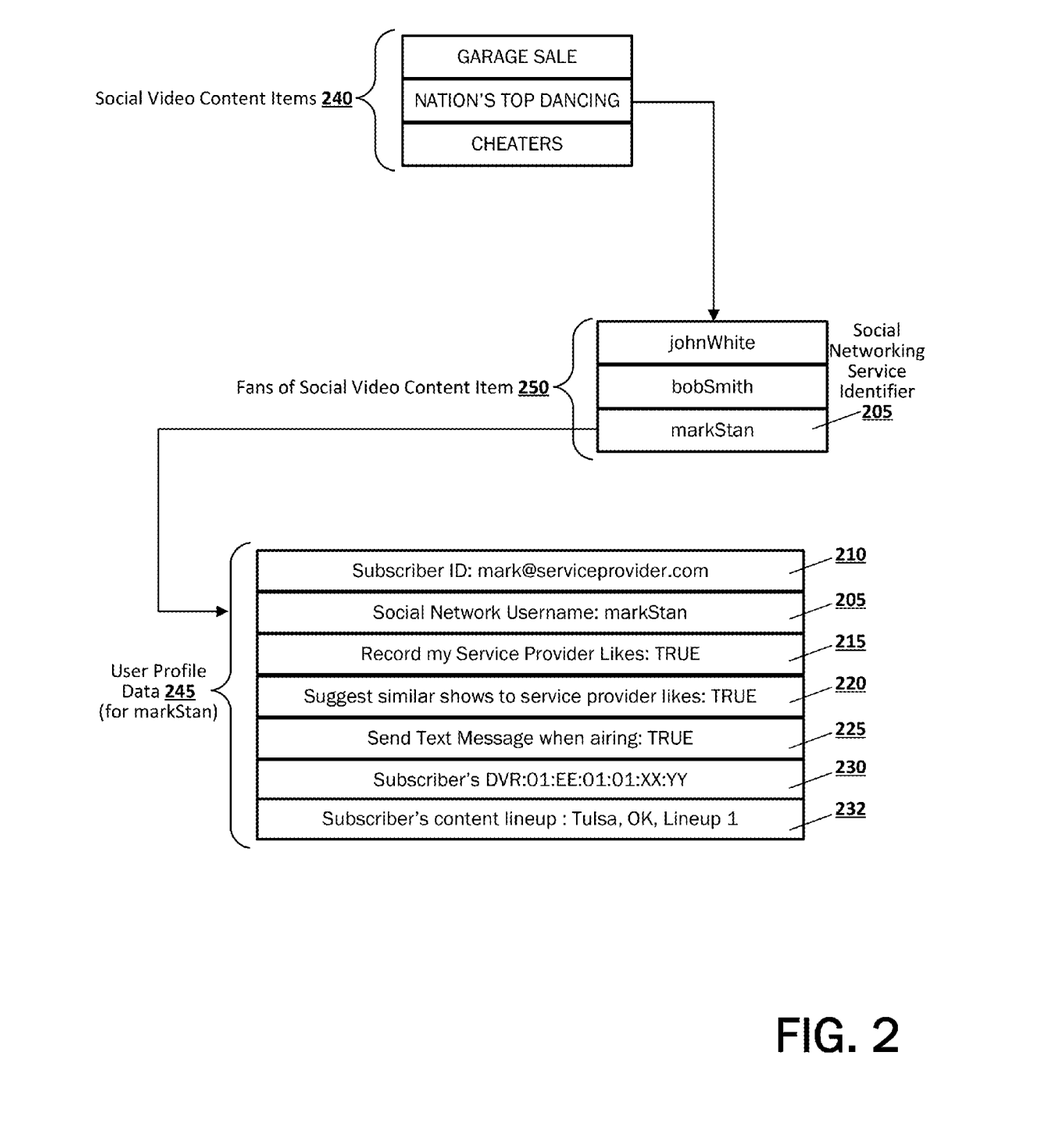
FIG. 2 illustrates an example of mapping a user's social networking service identifier to the user's video service provider account based on an affinity relationship between the user and a content object related to a video content item.

FIG. 2 illustrates an example of association made between a user's social networking service identifier 205, a social video content item with which the user 102 has an affinity relationship, and the user's video service provider account user profile data 245. According to an aspect, a listing of social networking system promoted shows (i.e., social video content items 240) is stored in a table in the index data system 109. When an affinity selection for a social video content item 240 is made by a user 102 via a social networking system 103, an identifier (e.g., show title) for the social video content item and the user's social networking system identifier 205 is received by the affinity mapping manager 106 and stored in the index data system 109.

As shown in the example illustrated in FIG. 2, a list of social networking system identifiers 205 for subscribers of the video content service provider who have indicated an affinity for a social video content item 240 via a social networking service affinity selection is indexed with the social video content item 240. Accordingly, an affinity relationship is created between the subscriber users and the social video content item 240. For example, an affinity relationship is created between the subscriber users associated with social networking system identifiers 205 "johnWhite," "bobSmith," and "markStan" and the social video content item 240 "Nation's Top Dancing." Users who have an affinity relationship with a social video content item 240 may be referred to as fans or registered fans 250 of the social video content item 240.

As described above, the affinity mapping manager 106 is operable to associate a user's social networking service identifier 205 with the user's video service provider account to retrieve the user's user profile data 245. According to an aspect, a user's social networking service identifier and associated video service account identifier may be indexed in the index data system 109. The affinity mapping manager 106 may query the index data system 109 using a user's social networking service identifier 205 to find the user's video service account identifier 210. The user's user profile data 245 may then be retrieved.

As illustrated in FIG. 2, the video service provider account user profile data 245 for the user associated with the social networking system identifier 205 "markStan" includes the user's video service provider account identifier 210, the user's social networking system identifier 205, the user's recording preference 215, recommendation preference 220, and notification preference 225 for social video content items 240 with which the user has an affinity relationship, the user's DVR MAC address 230, and a video programming lineup 232 available to the user based on the user's geographic location, permissions, restrictions, subscription, etc. Accordingly, the retrieved user profile data 245 may be used to perform the actions selected by the user 102.

Figure 3:
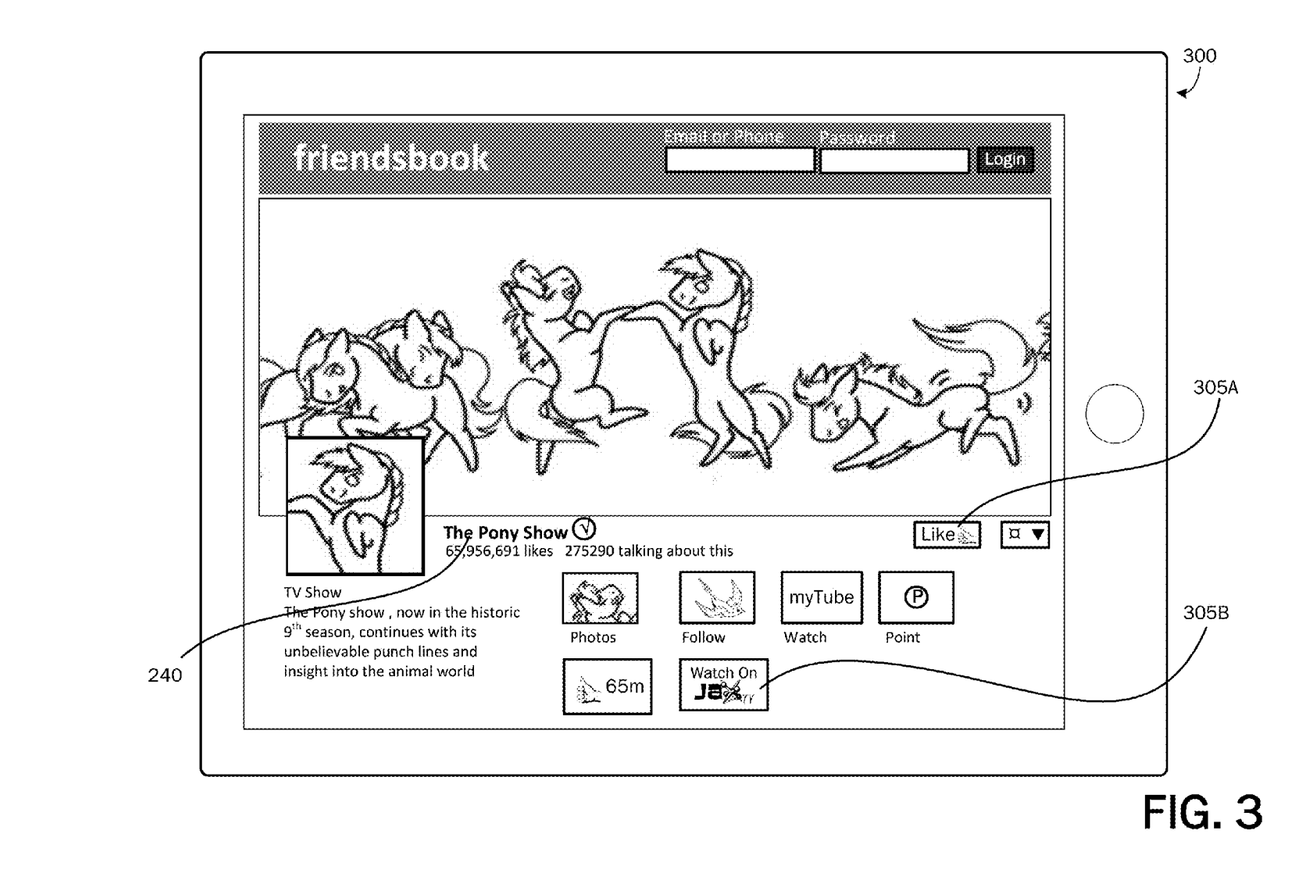
FIG. 3 illustrates an example social networking service content object related to a social video content item.

FIG. 3 is an illustration of an example social networking service content object 300 (e.g., a social networking service page) related to a social video content item 240 (e.g., a television program "The Pony Show"). As described above, an affinity UI component is linked to and displayed with a content object 300 via which users can select to indicate an affinity for a social video content item 240 related to the content object 300. According to an aspect, the affinity UI component may be a dedicated UI component 305B provided by the video service provider and integrated and displayed with a social content object 300 related to a social video content item 240. An affinity selection made by selecting the dedicated UI component 305B may be categorized as a social video content affinity selection. According to an aspect, when the affinity mapping manager 106 makes a request for a user's affinity selections, the affinity mapping manager 106 can request for the user's social video content affinity selections (affinity selections made via a selection of the dedicated affinity UI component 305B).

According to an aspect, the affinity UI component may be a general UI component 305A, for example, an existing social networking service UI component, such as a "like" button or other button or functionality that users can select to express a positive reaction to a content object 300. When an affinity selection is made by a user 102 by selecting the general UI component 305A, an affinity relationship may be created between the user 102 and the content item 300. According to an aspect, when the affinity mapping manager 106 makes a request for a user's affinity selections, the affinity mapping manager 106, an identifier for the content items, such as the illustrated content item 300, with which the user 102 has an affinity relationship may be communicated in a reply to the affinity mapping manager 106.

As should be appreciated, the affinity UI components 305A,B illustrated and described herein are for purposes of example only and are not restrictive of other affinity UI components and functionalities that may be provided for allowing a user 102 to indicate an affinity for a content object 300 related to a social video content item 240. In addition, user interaction with the an affinity UI component 305A,B may be accomplished through any suitable means, including touch, voice, keyboard selection, mouse click, gesture, and the like. According to an aspect, upon selection of an affinity UI component 305A,B, one or more interfaces may be presented for obtaining information from the user or for redirecting the user to another site for obtaining information such as: video content service provider selection, payment information, authentication information, permissions information, etc.

Figure 4:
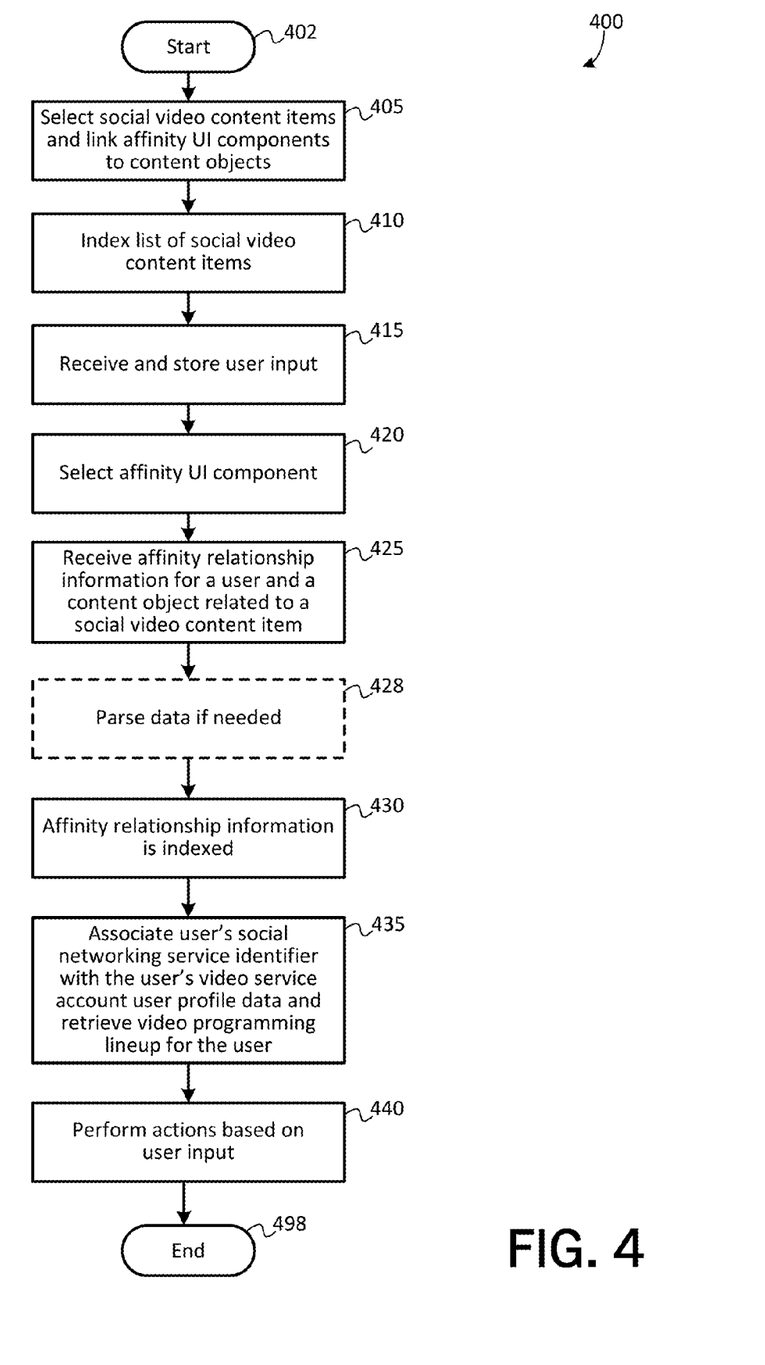
FIG. 4 is a flow chart of a method for automatically performing an action within a video service based on an identified affinity relationship between a video service user and a content object related to a video content item.

FIG. 4 is a high level flow chart of a method for performing an action within the video service system based on an identified affinity relationship between a video service user 102 and a content object 300 related to a social video content item 240. The method 400 starts at OPERATION 402 and proceeds to a setup OPERATION 405, where a video service provider selects one or more video content items available on the video service provider network to provide an affinity mapping service. According to an aspect, during the setup OPERATION 405, the affinity mapping manager 106 may request permissions required by a social networking service graph API call for retrieving user information associated with an affinity selection of a content object 300. Additionally, according to an aspect, the video service provider may subscribe to receive updates of a user's affinity relationship changes or affinity relationship changes of a content object 300 related to a social video content item 240 as they occur.

According to another aspect, during the setup OPERATION 405, dedicated affinity UI components 305B may be linked to content objects 300 related to the social video content items available on the video service provider network and which have been selected for inclusion for the affinity mapping service.

The method 400 proceeds to an indexing OPERATION 410, where the one or more video service provider-supported video content items (social video content items 240) are indexed in the index data system 109. According to an aspect, a social networking service identifier for content objects 300 related to the social video content items 240 may be included.

At setup OPERATION 415, a setup interface is provided to a user 102 via which the user can register for the affinity mapping service and input his/her social networking service identifier 205 and other information, such as the user's social networking service identifier 205 and user preferences 215, 220,225 regarding automatic actions that the user 102 would like for the video service provider to take upon receiving an indication of an affinity selection via the social networking service 103. According to an aspect, by enrolling in the affinity mapping service, the user 102 may give the video service provider permission to retrieve the user's affinity selection information from the social networking service 103. Additional information may be provided by the user 102 such as a password associated with the social networking service identifier 205, a mobile phone number and/or email address for receiving a text notification when the specific social video content item is airing, etc. The user input is received and stored in the user profile data system 111. The received user input may be associated with other user profile data 245 for the user (e.g., the user's video service provider subscriber identifier 210, media access control (MAC) addresses of the user's endpoint devices 110, the video programming lineup available to the user (e.g., based on region, subscription, etc.), user entitlements, user restrictions (e.g., parental controls), the user's viewing history, demographic information, video content preferences, etc.).

At OPERATION 420, a subscriber user 102 makes an affinity selection for a content object 300 related to a social video content item 240. For example, the user 102 may select an affinity UI component 305A,B linked to an advertisement (content object 300) for a television show (social video content item 240) that is included in the affinity mapping service.

At OPERATION 425, affinity relationship information is received. The received affinity relationship information may include the user's user social networking identifier and an identifier for the social video content item 240 related to the content object 300 affinitively selected by the user 102 at OPERATION 420. According to an aspect, the affinity mapping manager 106 may make a call to a social networking service graph API to request affinity relationship information. According to another aspect, updates of an affinity mapping service user's affinity relationship changes and/or updates of affinity relationship changes of a content object 300 related to a social video content item 240 may be automatically sent to the affinity mapping manager 106 as they occur.

According to an aspect, the received affinity relationship information may be parsed at optional parsing OPERATION 425. As described above, the affinity mapping manager 106 may request and receive affinity relationship information in various ways. For example, the affinity mapping manager 106 can make a request on behalf of a user 102 for content objects 300 for which the user 102 has made an affinity selection. Accordingly, the affinity mapping manager 106 may receive the user's affinity selections, which may or may not include affinitity selections other than for content objects 300 related to social video content items 240. For example, if the user 102 selects an affinity UI component 305A for a photo posted by the user's friend, the affinity relationship between the user 102 and the photo may not be of interest to the video service provider, but may be included in the received affinity relationship information.

As another example, the affinity mapping manager 106 can make a request on behalf of a content object 300 related to a social video content item 240 for users who have made an affinity selection for the content object 300. Accordingly, the affinity mapping manager 106 may receive a listing of users who have affinitively selected the content object 300, which may or may not include users who are not subscribers to the video service provider. The users who are not subscribers to the video service provider may not be of interest to the video service provider. Accordingly, affinity relationship information that is not of interest to the video service provider may be parsed at optional parsing OPERATION 425. According to an aspect, the affinity relationship information may be parsed by matching received user social networking service identifiers with indexed subscriber social networking service identifiers. According to another aspect, the affinity relationship information may be parsed by matching received content object identifiers or social video content item identifiers with indexed content object identifiers or social video content identifiers.

At indexing OPERATION 430, the user's social networking service identifier 205 is indexed with the social video content item 240 for which the user 102 made an affinity selection. The user 102 may be referred to as a registered fan 250 of the social video content item 240.

At association OPERATION 435, an association is made between the user's social networking service identifier 205 and the user's video service provider account to retrieve the user's user profile data 245. For example, the affinity mapping manager 106 may user the user's social networking service identifier 205 to query the index data system 109 for the user's video service account identifier 210 to retrieve the user's user profile data 245 from the user profile data system 111. As described above, the user's user profile data 245 includes the video programming lineup to which the user 102 is subscribed. The affinity mapping manager 106 queries the video content item system 112 for the video programming lineup to which the user 102 is subscribed and for available video on-demand content items.

If the social video content item 240 with which the user 102 has an affinity relationship is included in the video programming lineup or in the list of available video on-demand content items, the user profile data 245 is queried for action preferences selected by the user (or default actions if the user 102 has not specified his/her preferences), for example, the user's recording preference 215, recommendation preference 220, and notification preference 225. If the social video content item 240 with which the user 102 has an affinity relationship is not included in the video programming lineup or in the list of available video on-demand content items, the affinity mapping manager 106 may continually query the video content item system 112 for social video content items 240 with which the user 102 has an affinity relationship.

The method 400 proceeds to OPERATION 440, where the affinity mapping manager 106 performs or schedules the actions to be performed as specified by the user 102. For example, the user 102 may be provided with recommendations of video content items similar to the social video content item 240, and/or when the social video content item 240 airs, the user may be provided with a notification and/or the social video content item 240 may be automatically recorded to the user's DVR 107A,B.

The method 400 ends at OPERATION 498.

Figure 5:
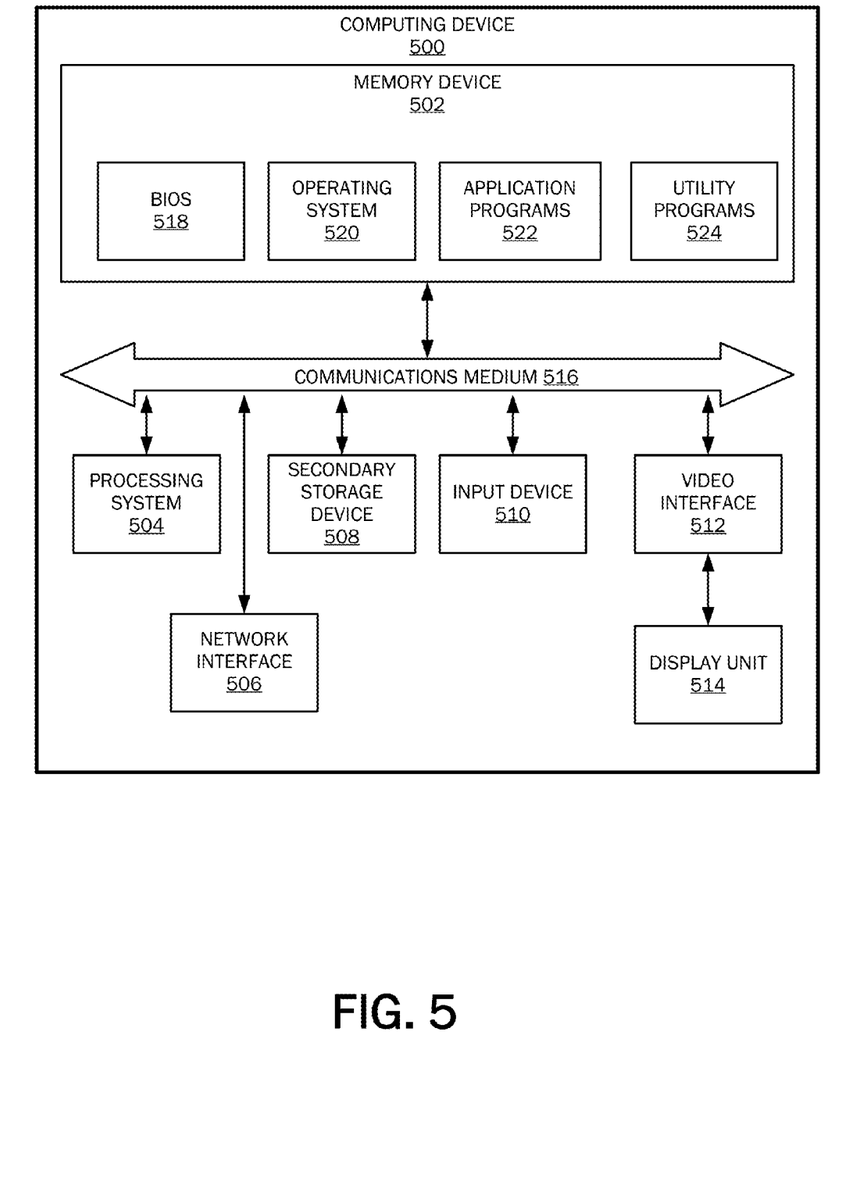
FIG. 5 is a block diagram illustrating example physical components of a computing device with which aspects may be practiced.

FIG. 5 is a block diagram illustrating example physical components of a computing device 500 with which aspects may be practiced. In some embodiments, one or a combination of the components of the system 100 may be implemented using one or more computing devices like the computing device 500. It should be appreciated that in other embodiments, one or a combination of the components of the system 100 may be implemented using computing devices having hardware components other than those illustrated in the example of FIG. 5.

Computing devices may be implemented in different ways in different embodiments. For instance, in the example of FIG. 5, the computing device includes a processing system 504, memory device 502, a network interface 506, a secondary storage device 508, an input device 510, a video interface 512, and a display unit 514. In other embodiments, the computing device 500 may be implemented using more or fewer hardware components (e.g., a video interface, a display unit, or an input device) or in combination with other types of computer systems and program modules. The memory device 502 includes one or more computer-readable storage media capable of storing data or computer-executable instructions. Memory device 502 thus may store the computer-executable instructions that, when executed by processing system 504, provide integration of content functionality with social network accounts, as described above with reference to FIGS. 1-4.

In various embodiments, the memory device 502 is implemented in various ways. For example, the memory device 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices or articles of manufacture that store data.

According to aspects, the term computer-readable media includes communication media and computer-readable storage media. Communication media includes information delivery media. Computer-executable instructions, data structures, and program modules may be embodied on a communications medium. For example, communication media can include wired media, such as a wired network or direct-wired connection, and wireless media, such as acoustic, radio frequency (RF), infrared, and other wireless media.

The term computer-readable storage medium and the plural, computer-readable storage media, refers only to devices and articles of manufacture that store data or computer-executable instructions readable by a computing device. Computer-readable storage medium does not include communications media. The term computer-readable storage medium encompasses volatile and nonvolatile and removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface 506 may allow the computing device 500 to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory device 502, the processing system 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory device 502 stores various types of data or software instructions. For instance, in the example of FIG. 5, the memory device 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory device 502 also stores one or more application programs 522 that, when executed by the processing system 504, cause the computing device 500 to provide applications to users. The memory device 502 also stores one or more utility programs 524 that, when executed by the processing system 504, cause the computing device 500 to provide utilities to other software programs. Embodiments of the present invention may be used in various distributed computing environments where tasks are performed by remote processing devices that are linked through a communications network in a distributed computing environment.

Figure 6A:
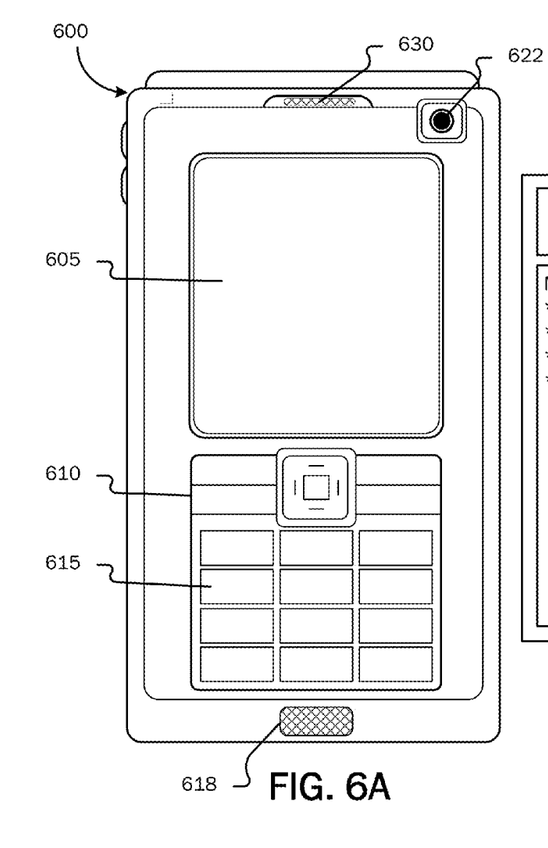
FIGS. 6A-6B illustrate a suitable mobile computing environment with which aspects may be practiced.
Figure 6B:
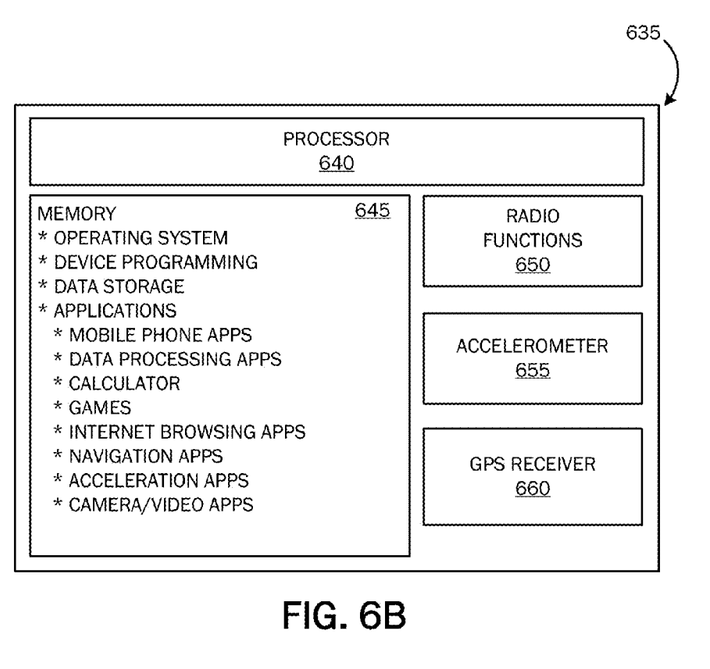

FIGS. 6A-6B illustrate a suitable mobile computing environment, for example, a mobile computing device 600, a mobile phone/smartphone, a tablet device, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the mobile computing device 600 may be performed via a variety of suitable means, such as, touch screen input via the display screen 605, keyboard or keypad input via a data entry area 610, key input via one or more selectable buttons or controls 615, voice input via a microphone 618 disposed on the mobile computing device 600, photographic input via a camera 622 functionality associated with the mobile computing device, or any other suitable input means. Data may be output via the mobile computing device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be used for storing a device operating system, device programming, one or more stored applications, for example, mobile telephone applications, data processing applications, calculators, games, Internet browsing applications, navigation applications, acceleration applications, camera and/or video applications, etc. According to an aspect, application software to practice aspects of the present invention may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the mobile computing device 600 to communicate with other communication devices and systems via a wireless network. Radio functions 650 may be used to communicate with a wireless or Wi-Fi based positioning system to determine a device's 600 location.

Figure 7:
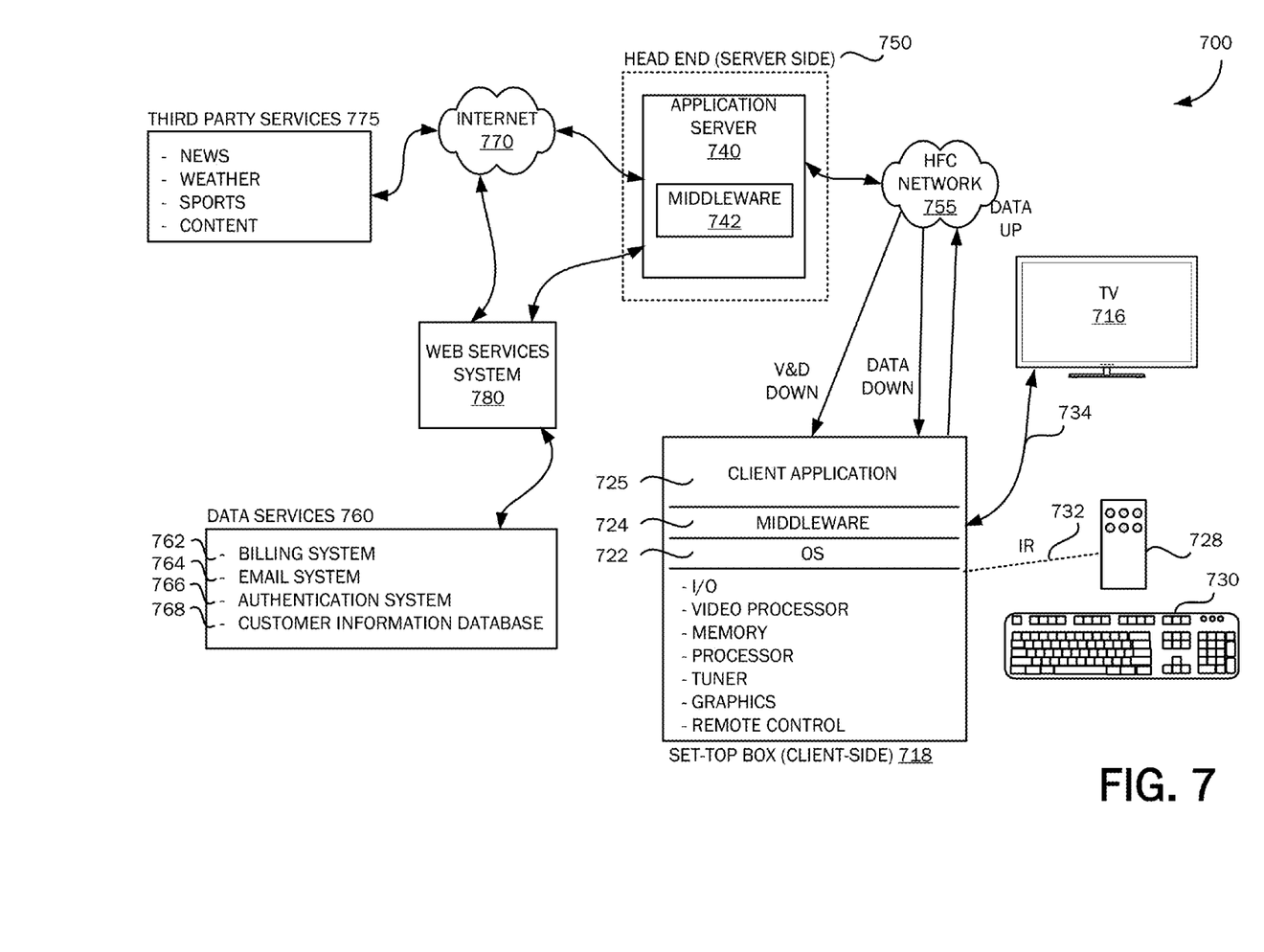
FIG. 7 is a simplified block diagram illustrating a cable television services system architecture operating environment with which aspects may be practiced.

FIG. 7 is a simplified block diagram illustrating a cable television services system 700 (hereafter referred to as "CATV") architecture providing an operating environment according to an embodiment. As can be appreciated, a CATV architecture 700 is but one of various types of systems that may be used to provide the embodiments of the present invention. Referring now to FIG. 7, digital and analog video programming, information content and interactive television services are provided via a hybrid fiber coax (HFC) network 755 to a television set 716 for consumption by a CATV customer. As is known to those skilled in the art, HFC networks 755 combine both optical fiber and coaxial cable lines. Typically, optical fiber runs from the cable head end 750 to neighborhoods of subscribers. Coaxial cable runs from the optical fiber feeders to each customer or subscriber. The functionality of the HFC network 755 allows for efficient bidirectional data flow between the STB 718 and a server-side application server 740.

The CATV system 700 is in the form of a distributed client-server computing system for providing video and data flow across the HFC network 755 between server-side services providers (e.g., cable television/services providers) via a server-side head end 750 and a client-side customer via STB 718 in communication with a customer receiving device, such as the television set 716. As is understood by those skilled in the art, modern CATV systems 700 may provide a variety of services across the HFC network 755 including traditional digital and analog video programming, telephone services, high speed Internet access, video-on-demand, and information services.

On the client side of the CATV system 700, digital and analog video programming and digital and analog data are provided to the customer television set 716 via STB 718. Interactive television services that allow a customer to input data to the CATV system 700 likewise are provided by the STB 718. As illustrated in FIG. 7, the STB 718 is a multipurpose computing device having a computer processor, memory, and an input/output mechanism. The input/output mechanism receives input from server-side processes via the HFC network 755 and from customers via input devices such as the remote control device 728, keyboard 730, or other computing device, such as a tablet/slate computer, mobile computing device, etc. The remote control device 728 and the keyboard 730 may communicate with the STB 718 via a suitable communication transport such as the infrared connection 732. The STB 718 also includes a video processor for processing and providing digital and analog video signaling to the television set 716 via a cable communication transport 734. A multi-channel tuner is provided for processing video and data to and from the STB 718 and the server-side head end system 750, described below.

The STB 718 also includes an operating system 722 for directing the functions of the STB 718 in conjunction with a variety of client applications 725. For example, if a client application 725 requires a news flash from a third-party news source to be displayed on the television set 716, the operating system 722 may cause the graphics functionality and video processor of the STB 718, for example, to output the news flash to the television set 716 at the direction of the client application 725 responsible for displaying news items.

Because a variety of different operating systems 722 may be used by a variety of different brands and types of set-top boxes 718, a middleware layer 724 may be provided to allow a given software application to be executed by a variety of different operating systems 722. According to an embodiment, the middleware layer 724 may include a set of application programming interfaces (APIs) that are exposed to client applications 725 and operating systems 722 that allow the client applications to communicate with the operating systems 722 through common data calls understood via the API set. As described below, a corresponding middleware layer 742 is included on the server side of the CATV system 700 for facilitating communication between the server-side application server 740 and the client-side STB 718. The middleware layer 742 of the server-side application server 740 and the middleware layer 724 of the client-side STB 718 may format data passed between the client side and server side according to the Extensible Markup Language (XML).

According to one embodiment, the STB 718 passes digital and analog video and data signaling to the television set 716 via a one-way communication transport 734. According to other embodiments, two-way communication transports may be used, for example, via high definition multimedia (HDMI) ports. The STB 718 may receive video and data from the server side of the CATV system 700 via the HFC network 755 through a video/data downlink and data via a data downlink. The STB 718 may transmit data from the client side of the CATV system 700 to the server side of the CATV system 700 via the HFC network 755 via one data uplink. The video/data downlink is an "in band" downlink that allows for digital and analog video and data signaling from the server side of the CATV system 700 through the HFC network 755 to the STB 718 for use by the STB 718 and for distribution to the television set 716. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 755 and the STB 718 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side STB 718 and the server-side application server 740 is typically passed through the "out of band" data links. Alternatively, an "in band" data carousel may be positioned in an "in band" channel into which a data feed may be processed from the server-side application server 740 through the HFC network 755 to the client-side STB 718. Operation of data transport between components of the CATV system 700, described with reference to FIG. 7, is well known to those skilled in the art.

Referring still to FIG. 7, the head end 750 of the CATV system 700 is positioned on the server side of the CATV system 700 and includes hardware and software systems responsible for originating and managing content for distributing through the HFC network 755 to client-side STBs 718 for presentation to customers via television sets 716. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side STB 718 via the HFC network 755. As described above with reference to the STB 718, the application server 740 includes a middleware layer 742 for processing and preparing data from the head end 750 of the CATV system 700 for receipt and use by the client-side STB 718. For example, the application server 740 via the middleware layer 742 may obtain data from third-party services 775 via the Internet 770 for transmitting to a customer through the HFC network 755 and the STB 718. For example, content data and metadata of a third party service 775 may be downloaded by the application server 740 via the Internet 770. When the application server 740 receives the downloaded third party services 775, the middleware layer 742 may be used to format the content metadata for receipt and use by the STB 718. Therefore, content metadata may be sent and categorized based on the availability to the customer's program guide data.

According to one embodiment, data obtained and managed by the middleware layer 742 of the application server 740 is formatted according to the Extensible Markup Language and is passed to the STB 718 through the HFC network 755 where the XML-formatted data may be used by a client application 725 in concert with the middleware layer 724, as described above. As should be appreciated by those skilled in the art, a variety of third-party services data 775, including news data, weather data, sports data and other information content may be obtained by the application server 740 via distributed computing environments such as the Internet 770 for provision to customers via the HFC network 755 and the STB 718.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700, which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

An email system 764 may include information such as user accounts, usernames, address books, archived messages, subscriber profiles, subscriber IDs, and passwords used by customer for access to electronic mail services.

An authentication system 766 may include information such as secure user names, subscriber profiles, subscriber IDs, and passwords used by customers for access to network services. A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

As should be understood by those skilled in the art, the disparate systems 762, 764, 766, 768 may be integrated or provided in any combination of separate systems, wherein FIG. 7 shows only one example.

Referring still to FIG. 7, web services system 780 is illustrated between the application server 740 and the data services 760. According to embodiments, web services system 780 serves as a collection point for data requested from each of the disparate data services systems comprising data services 760. According to embodiments, when the application server 740 requires customer services data from one or more of the data services 760, the application server 740 passes a data query to the web services system 780. The web services system formulates a data query to each of the available data services systems 760 for obtaining any required data for a requesting customer as identified by an STB-identification associated with the customer. The web services system 780 serves as an abstraction layer between the various data services systems 760 and the application server 740. That is, the application server 740 is not required to communicate with the disparate data services systems 760, nor is the application server 740 required to understand the data structures or data types used by the disparate data services systems 760. The web services system 780 is operative to communicate with each of the disparate data services systems 760 for obtaining necessary customer data. The customer data obtained by the web services system 780 is assembled and is returned to the application server 740 for ultimate processing via the middleware layer 742, as described above.

Aspects of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be used in various distributed computing environments where tasks are performed by remote processing devices that are linked through a communications network in a distributed computing environment, and where programs may be located in both local and remote memory storage.

Aspects, for example, are described above with reference to block diagrams or operational illustrations of methods, systems, and computer program products according to embodiments. The functions/acts noted in the blocks may occur out of the order as shown in any flowchart or described herein with reference to FIGS. 1-4. For example, two processes shown or described in succession may in fact be executed substantially concurrently or the blocks may sometimes be executed in the reverse order, depending upon the functionality/acts involved.

While certain aspects have been described, other aspects may exist. Furthermore, although aspects have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering or inserting or deleting a step or process, without departing from the aspects.

The foregoing description of aspects of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
   receiving, via one or more computer hardware components, a social networking service identifier of a video service user for a social networking service;
   receiving, via the one or more computer hardware components, affinity relationship information from the social networking service, wherein the affinity relationship information corresponds to the video service user and a content object related to a video content item;
   mapping, via the one or more computer hardware components, an affinity relationship based in part on the social networking service identifier of the video service user and the video content item;
   storing, via the one or more computer hardware components, the affinity relationship corresponding to the social networking service identifier and the video content item;
   retrieving, via the one or more computer hardware components and according to the affinity relationship, user profile data associated with a video service provider account of a video service provider system for the video service user including a video service provider account identifier, a recording preference, a recommendation preference, and a notification preference for video content items with which the video service user has the affinity relationship;

querying, via the one or more computer hardware components, an inventory of the video content items available to the video service user for the video content item related to the content object according to the affinity relationship; and performing, via the one or more computer hardware components, automatic video service actions including sending a request to automatically record the video content item related to the content object to a digital video recorder associated with the video service user, sending a request to automatically tune to a channel airing the video content item related to the content object, automatically notifying the video service user when the video content item related to the content object is airing, and sending a request to provide one or more recommended video content items similar to the video content item related to the content object within the video provider system based on the user profile data when the video content item related to the content object with which the user has the affinity relationship is found in the inventory of the video content items.

2. The method of claim 1, wherein prior to querying the inventory of the video content items available to the video service user:

indexing the social networking service identifier for the social networking service with the video content item related to the content object with which the video service user has the affinity relationship; and associating the social networking service identifier for the social networking service with the video service provider account identifier of the video service user for ascertaining the inventory of the video content items available to the video service user.

3. The method of claim 2, wherein ascertaining the inventory of the video content items available to the video service user comprises ascertaining on demand content items and a video programming lineup available to the video service user based on at least one of:

a video service subscription;
a geographic location;
permissions associated with the video service provider account; and
restrictions associated with the video service provider account.

4. The method of claim 1, further comprising receiving permission to retrieve the affinity relationship information from the social networking service.

5. The method of claim 1, wherein the affinity relationship between the video service user and the content object comprises a relationship created via a selection by the video service user of an affinity UI component linked to the content object.

6. The method of claim 5, wherein receiving the affinity relationship information from the social networking service comprises receiving a listing of content objects for which the video service user has made an affinity selection.

7. The method of claim 6, further comprising parsing the listing of content objects for content objects related to the video content items available in a video service provider's network and included in an affinity mapping service offered by the video service provider system.

8. The method of claim 1, wherein receiving affinity relationship information from the social networking service comprises receiving a listing of users who have made an affinity selection for the content object related to the video content item.

9. The method of claim 8, further comprising parsing the listing of users for users who are subscribers of the video service provider system and who are enrolled in an affinity mapping service offered by the video service provider system.

10. The method of claim 5, wherein the affinity UI component is a dedicated UI component provided by the video service provider system and linked to the content object related to the video content item available in a video service provider's network and included in an affinity mapping service offered by the video service provider system.

11. The method of claim 1, further comprising receiving user preference selections of the automatic video service actions for the video service provider system to perform when the affinity relationship is identified.

12. A system comprising:

one or more computer hardware components including processor and computer storage, wherein the one or more computer hardware components of the system are configured to:

receive a social networking service identifier of a video service user for a social networking service;

receive affinity relationship information from the social networking service, wherein the affinity relationship information corresponds to the video service user and a content object related to a video content item;

map an affinity relationship based in part on the social networking service identifier of the video service user and the video content item;

store the affinity relationship corresponding to the social networking service identifier and the video content item;

retrieve, according to the affinity relationship, user profile data associated with a video service provider account of a video service provider system for the video service user including a video service provider account identifier, a recording preference, a recommendation preference, and a notification preference for video content items with which the video service user has the affinity relationship;

query an inventory of the video content items available to the video service user for the video content item related to the content object according to the affinity relationship; and perform automatic video service actions that operate to send a request to automatically record the video content item related to the content object to a digital video recorder associated with the video service user, send a request to automatically tune to a channel airing the video content item related to the content object, automatically notify the video service user when the video content item related to the content object is airing, and send a request to provide one or more recommended video content items similar to the video content item related to the content object within the video provider system based on the user profile data when the video content item related to the content object with which the user has the affinity relationship is found in the inventory of the video content items.

13. The system of claim 12, further comprising:

an index data memory unit operable to store the social networking service identifier for the social networking service with the video content item related to the content object with which the video service user has the affinity relationship; and an affinity mapping manager operable to associate the social networking service identifier for the social networking service with the video service provider account identifier of the video service user for ascertaining the inventory of the video content items available to the video service user.

14. The system of claim 13, wherein the inventory of the video content items available to the video service user comprises on demand content items and a video programming lineup available to the video service user based on at least one of:

a video service subscription;
a geographic location;
permissions associated with the video service provider account; and
restrictions associated with the video service provider account.

15. The system of claim 12, wherein the affinity relationship comprises a relationship created between the video service user and the content object via a selection by the video service user of an affinity UI component linked to the content object.

16. The system of claim 15, wherein the one or more computer hardware components are further operable to:

receive a listing of content objects for which the video service user has made an affinity selection; and
parse the listing of content objects for content objects related to the video content items available in a video service provider's network and included in an affinity mapping service offered by the video service provider system.

17. The system of claim 15, wherein the one or more computer hardware components are further operable to:

receive a listing of users who have made an affinity selection for the content object related to the video content item; and
parse the listing of users for users who are subscribers of the video service provider system and who are enrolled in an affinity mapping service offered by the video service provider system.

18. The system of claim 12, wherein the one or more computer hardware components are further operable to:

send the request to automatically tune to the channel airing the video content item related to the content object with which the user has the affinity relationship to an endpoint device;
send a notification to the video service user when the video content item related to the content object with which the user has the affinity relationship is airing;
send the request for the one or more recommended video content items similar to the video content item related to the content object with which the user has the affinity relationship to a recommendation engine;
receive the one or more recommended video content items similar to the video content item related to the content object with which the user has the affinity relationship from the recommendation engine; and
provide the one or more recommended video content items similar to the video content item related to the content object with which the user has the affinity relationship to the endpoint device for display to the video service user.

19. A non-transitory computer readable medium containing computer executable instructions which, when executed, use one or more computer hardware components to perform a method comprising:

receiving, via the one or more computer hardware components, a social networking service identifier of a video service user for a social networking service;
receiving, via the one or more computer hardware components, affinity relationship information from the social networking service, wherein the affinity relationship information corresponds to the video service user and a content object related to a video content item;
mapping, via the one or more computer hardware components, an affinity relationship based in part on the social networking service identifier of the video service user and the video content item;
storing, via the one or more computer hardware components, the affinity relationship corresponding to the social networking service identifier and the video content item;
retrieving, via the one or more computer hardware components and according to the affinity relationship, user profile data associated with a video service provider account of a video service provider system for the video service user including a video service provider account identifier, a recording preference, a recommendation preference, and a notification preference for video content items with which the video service user has the affinity relationship;
querying, via the one or more computer hardware components, an inventory of the video content items available to the video service user for the video content item related to the content object according to the affinity relationship; and
performing, via the one or more computer hardware components, automatic video service actions including sending a request to automatically record the video content item related to the content object to a digital video recorder associated with the video service user, sending a request to automatically tune to a channel airing the video content item related to the content object, automatically notifying the video service user when the video content item related to the content object is airing, and sending a request to provide one or more recommended video content items similar to the video content item related to the content object within the video provider system based on the user profile data when the video content item related to the content object with which the user has the affinity relationship is found in the inventory of the video content items.

* * * * *